United States Patent
Arrigo

(10) Patent No.: US 9,480,267 B2
(45) Date of Patent: Nov. 1, 2016

(54) REFRIGERATOR CRISPER AND OZONATION SYSTEM AND METHOD

(71) Applicant: Vincent Arrigo, Sarasota, FL (US)

(72) Inventor: Vincent Arrigo, Sarasota, FL (US)

(*) Notice: Subject to any disclaimer, the term of this patent is extended or adjusted under 35 U.S.C. 154(b) by 0 days.

(21) Appl. No.: 13/894,610

(22) Filed: May 15, 2013

(65) Prior Publication Data

US 2014/0342064 A1  Nov. 20, 2014

Related U.S. Application Data

(63) Continuation-in-part of application No. 13/668,447, filed on Nov. 5, 2012, now abandoned, which is a continuation-in-part of application No. 13/368,195, filed on Feb. 7, 2012, now abandoned, which is a continuation-in-part of application No. 13/013,327, filed on Jan. 25, 2011, now abandoned.

(51) Int. Cl.
- *A23B 7/055* (2006.01)
- *A23B 7/152* (2006.01)

(52) U.S. Cl.
CPC ............... *A23B 7/055* (2013.01); *A23B 7/152* (2013.01)

(58) Field of Classification Search
CPC ........... F23B 7/055; A23B 4/00; A23B 7/00; A23B 4/06; A23B 7/015; A23B 7/144
USPC ................. 62/127, 176.1, 264, 382; 99/467; 426/312
See application file for complete search history.

(56) References Cited

U.S. PATENT DOCUMENTS

| | | | |
|---|---|---|---|
| 4,845,958 A | | 7/1989 | Senda et al. |
| 5,253,488 A | * | 10/1993 | Kim et al. .................... 62/382 |
| 5,661,979 A | | 9/1997 | DeBoer |
| 5,722,254 A | | 3/1998 | Roth et al. |
| 5,782,094 A | | 7/1998 | Freeman |
| 5,927,078 A | | 7/1999 | Watanabe et al. |
| 5,946,919 A | | 9/1999 | McKinney et al. |
| 6,113,671 A | * | 9/2000 | Garrett ............................. 95/98 |
| 6,295,820 B1 | | 10/2001 | Cauchy et al. |
| 6,477,853 B1 | * | 11/2002 | Khorram ........................ 62/264 |
| 6,736,885 B2 | * | 5/2004 | Kaiser ............................ 96/224 |
| 6,763,665 B2 | | 7/2004 | Clark et al. |
| 6,976,371 B2 | | 12/2005 | Gleason et al. |
| 7,050,888 B2 | | 5/2006 | Schneider et al. |

(Continued)

FOREIGN PATENT DOCUMENTS

| | | |
|---|---|---|
| JP | 2002-335858 | 11/2002 |
| JP | 2007-222135 | 9/2007 |

(Continued)

OTHER PUBLICATIONS

PCT International Searching Authority; International Search Report and written opinion dated May 15, 2013; entire document.

*Primary Examiner* — Mohammad M Ali
(74) *Attorney, Agent, or Firm* — Larson & Larson, P.A.; Patrick A. Reid; Justin P. Miller

(57) ABSTRACT

A crisper drawer for postponing postharvest produce deterioration having a drawer housing that substantially defines the size and shape of the crisper drawer and fits within a residential refrigerator. A chamber within the drawer housing is cooled by the refrigerator. An ozone generator provides gaseous ozone to the chamber, and an ethylene scrubber reduces levels of ethylene in the chamber. An ozone level control with the ozone generator controls ozone levels.

5 Claims, 5 Drawing Sheets

(56) References Cited

U.S. PATENT DOCUMENTS

| | | |
|---|---|---|
| 7,296,422 B2 | 11/2007 | Strohm et al. |
| 7,308,796 B1 | 12/2007 | Eager |
| 7,401,469 B2 * | 7/2008 | Joshi et al. .................. 62/127 |
| 7,669,434 B2 * | 3/2010 | Leclear et al. ................ 62/331 |
| 8,250,881 B1 * | 8/2012 | Reihl ............................. 62/451 |
| 8,277,734 B2 * | 10/2012 | Koudymov et al. .......... 422/119 |
| 2005/0217282 A1 | 10/2005 | Strohm et al. |
| 2010/0047116 A1 * | 2/2010 | Garner ............................ 422/4 |

FOREIGN PATENT DOCUMENTS

| | | |
|---|---|---|
| KR | 10-0568949 | 4/2006 |
| WO | 90-02572 | 3/1990 |

* cited by examiner

US 9,480,267 B2

REFRIGERATOR CRISPER AND OZONATION SYSTEM AND METHOD

CROSS-REFERENCE TO RELATED APPLICATION

This application is a Continuation in Part claiming priority to U.S. patent application Ser. No. 13/668,447 filed on Nov. 5, 2012 which is a Continuation in Part application claiming priority to U.S. patent application Ser. No. 13/368,195 filed on Feb. 7, 2012 which is a Continuation in Part application claiming priority to U.S. patent application Ser. No. 13/013,327 filed on Jan. 25, 2011 and also claims priority to U.S. Provisional Patent Application Ser. No. 61/615,994 filed on Mar. 27, 2012; this application is also a Continuation-in-Part application claiming priority to International Application Number PCT/US2013/25151, filed Feb. 7, 2013, which is a Continuation of U.S. patent application Ser. No. 13/368,195, filed on Feb. 7, 2012, which is a Continuation-in-Part application claiming priority to U.S. patent application Ser. No. 13/013,327 filed on Jan. 25, 2011; the entire contents of which are hereby incorporated by reference.

FIELD OF THE INVENTION

The present invention relates to the field of produce storage chambers designed to reduce spoilage. More specifically, to a refrigerator crisper drawer that exposes produce to ozone and an ethylene scrubber.

BACKGROUND OF THE INVENTION

Due to various nutrient and antioxidant profiles, consumption of fresh produce is generally accepted as essential to a healthy diet. Regular consumption of fruit is associated with reduced risks of cancer, cardiovascular disease (especially coronary heart disease), stroke, Alzheimer's disease, cataracts, and some of the general functional declines associated with aging. Diets that include a sufficient amount of fruits and vegetables also help reduce the chance of developing kidney stones and may help reduce the effects of bone loss. Fruits are also low in calories and are often integral to weight loss plans and generally healthy, balanced diets.

Most fruits and vegetables ripen after they are removed from their associated plants and stalks. Such ripening often changes the characteristics of the produce, including altering sweetness levels, texture, and firmness. Consumption of fruits and vegetables at the optimal point in the ripening process helps maximize not only taste and enjoyment of these foods, but may also maximize their health benefits.

Ripening is a natural process which is primarily a result of the production of ripening enzymes, many of which are triggered by the release of ethylene by the produce. Ethylene is a simple hydrocarbon gas produced when a fruit ripens, and is known to promote the upregulation of genes that cause the expression of enzymes that foster ripening. These enzymes may change the color of the skin as chlorophyll is degraded, aid in the production of new pigments, foster the breakdown of acids that make fruit taste sour, convert starches into sweet sugars, and soften pectin.

Maintaining most fruits and vegetables in a sufficiently cold state after harvest helps extend and ensure shelf life, most notably by reducing the release of ethylene. However, storage of produce in an isolated area without refrigeration causes a build up of ethylene and results in faster ripening (and rotting) of fruits and vegetables.

Ozone is a pungent, naturally-occurring gas possessing strong oxidizing properties, and has a long history of safe use in the disinfection of water sources. Ozone rapidly attacks bacterial cell walls and is generally thought to be a more effective anti-pathogenic agent against plant spores and mammalian parasites than chlorine. Ozone is reported to have 1.5 times the oxidizing potential of chlorine, yet contact times for this antimicrobial action are typically 4-5 times less than that of chlorine, all without the unwanted byproducts associated with chlorine. Ozone is also known to degrade ethylene.

Most households contain refrigerators, and most of these have crisper drawers. These drawers typically employ a slide mechanism to control the humidity within the drawer. Closing the slide (reducing the size of the opening from the drawer to the larger inner compartment of a refrigerator) raises the humidity within the crisper. Opening the slide (increasing the size of the opening from the drawer to the larger inner compartment of the refrigerator) decreases the humidity in the crisper. Controlled humidity keeps the vegetables from drying out, allowing them to retain their nutritional content, freshness and crispness for longer periods. They are typically positioned at the bottom of the refrigerator to take advantage of the coolest regions of air within the refrigerator.

There are a number of disadvantages associated with crisper drawers. First, these devices are set to a temperature that is fixed in relation to the temperature of the main refrigerator compartment. This is not always the ideal temperature for postponing post-harvest produce spoilage. Second, by enclosing produce in a substantially enclosed chamber, the levels of ethylene increase, thus promoting postharvest produce spoilage. Accordingly, there is a need in the art of produce storage and crisper drawers for a robust chamber for use with fresh fruits and vegetables.

SUMMARY OF THE INVENTION

In view of the foregoing background, it is therefore an object of the present invention to provide a refrigerator crisper drawer capable of encasing produce, having a temperature regulation means, at least one ozone generation unit, and at least one ethylene scrubber. The crisper is therefore capable of delaying postharvest produce deterioration using temperature control, ozone generation, and ethylene scrubbing.

One embodiment of the present invention contemplates a refrigerator crisper drawer that postpones postharvest produce deterioration. In particular, a drawer housing substantially defines the size and shape of the crisper drawer. The drawer housing also has a sufficient size and dimension to fit in a residential refrigerator. An ozone generator provides gaseous ozone to the chamber of the drawer housing, and an ethylene scrubber reduces levels of ethylene in the chamber of the drawer housing. An ozone level control with the ozone generator controls ozone levels.

Embodiments of the crisper drawer also employs means to control ethylene levels, a thermostat with the refrigerator, and a thermostat with the refrigerator for separately controlling temperature in the chamber of the drawer housing.

In related embodiments, the ethylene scrubber comprises potassium permanganate and/or comprises a titanium oxide photocatalyst. The ozone generator is a high frequency corona discharge ozone generator and/or an ultraviolet light source.

In an embodiment, the refrigeration system preferably maintains chamber temperature from approximately 10° C.

to 20° C., but more preferably maintains chamber temperature from approximately 12° C. to 14° C. The ozone generator maintains chamber ozone concentration from approximately 0.005 ppm to approximately 0.35 ppm, and preferably maintains chamber ozone concentration from approximately 0.05 ppm to approximately 0.15 ppm. The chamber relative humidity is maintained from approximately 80% to 100%. Chamber ethylene concentration is maintained at less than 0.015 ppm.

In a related embodiment, an insulated crisper drawer for postponing postharvest produce deterioration comprises a drawer housing with a substantially sealed interior chamber capable of encasing produce. The drawer housing substantially defines the size and shape of the crisper drawer, and the drawer housing has a sufficient size and dimension to fit in a residential refrigerator. The interior chamber of the drawer housing is chilled by the refrigerator. An ethylene scrubber within the interior chamber is capable of reducing interior chamber ethylene gas concentrations to delay postharvest produce deterioration. A refrigeration system in communication with the interior chamber for the purpose of maintaining an interior chamber temperature delays postharvest produce deterioration and maintains a relative humidity in the interior chamber that delays postharvest produce deterioration. An ozone generator in communication with the interior chamber maintains a chamber ozone concentration that delays postharvest produce deterioration.

The invention also contemplates a method of reducing postharvest produce deterioration comprising the steps of: placing produce within an interior of a crisper drawer housed inside a refrigerator; cooling the interior of the crisper drawer to a temperature from about 10° C. to 20° C.; introducing gaseous ozone into the interior of the crisper drawer to maintain a crisper drawer ozone concentration between approximately 0.005 ppm and approximately 0.35 ppm; and maintaining a relative humidity within the interior of the crisper drawer ranging from about 80% to 100% relative humidity. In a related method, ethylene is scrubbed from the crisper drawer.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE INVENTION

In the Summary of the Invention above and in the Detailed Description of the Invention and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other elements, steps, etc. are optionally present. When reference is made herein to a method comprising two or more defined steps, the steps can be carried in any order or simultaneously (except where the context excludes that possibility), and the method can include at least one step which are carried out before any of the defined steps, between two of the defined steps, or after all of the defined steps (except where the context excludes that possibility).

In this section, the present invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art.

As illustrated in FIGS. 1 through 5, the invention is directed to a refrigerator crisper drawer 100 used to store fruits, vegetables and/or other related perishable foods to ensure ripeness. The crisper drawer 100 helps regulate the temperature and humidity of produce and to ensure regulated and reduced levels of ethylene. In doing so, the crisper drawer 100 maintains the ripeness of produce stored within its confines. The invention contemplates a design for use in residential and commercial refrigerators, both self-contained and walk-in units.

Figure 1:
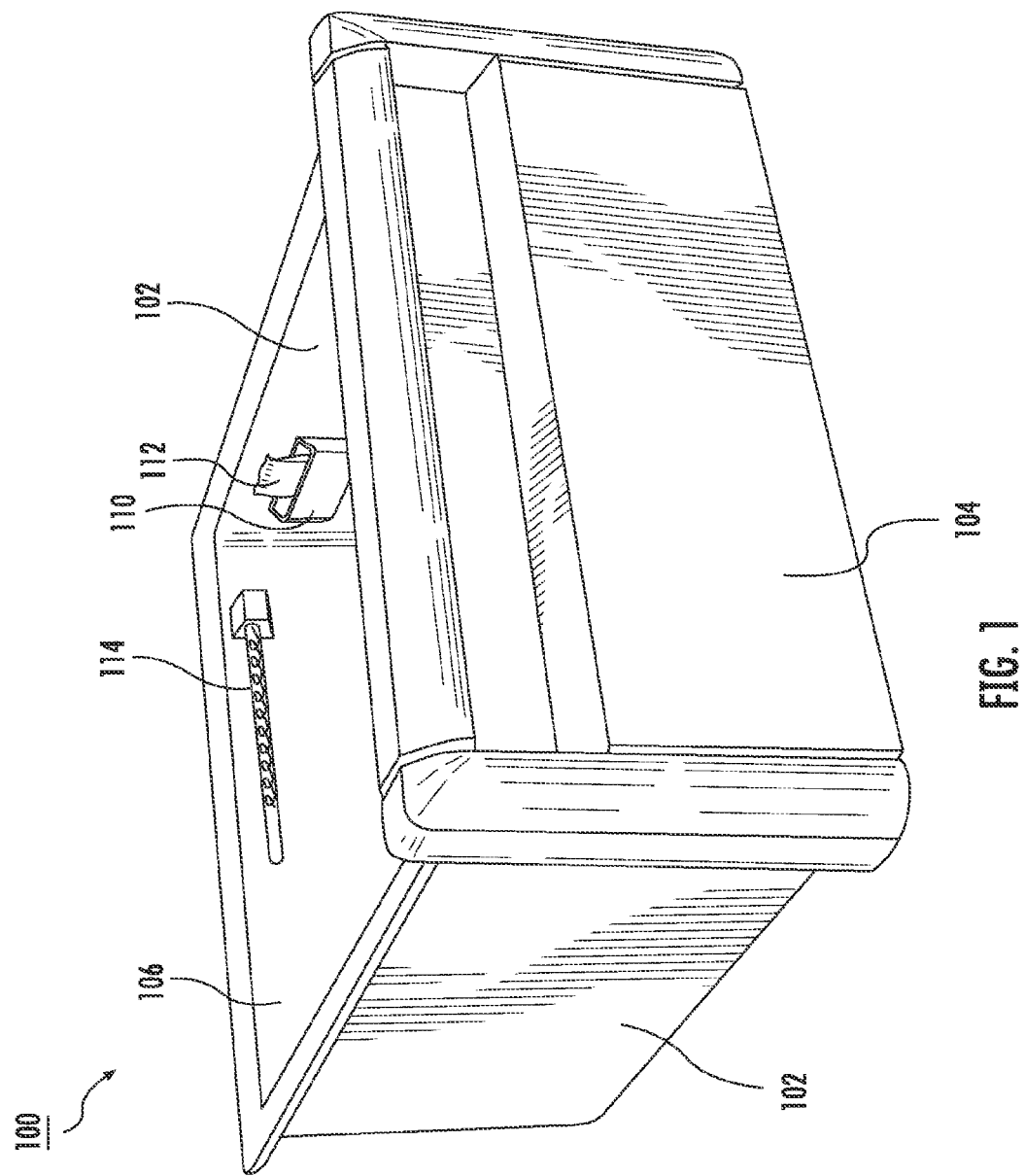
FIG. 1 illustrates a front perspective view of one embodiment of the crisper.
Figure 2:
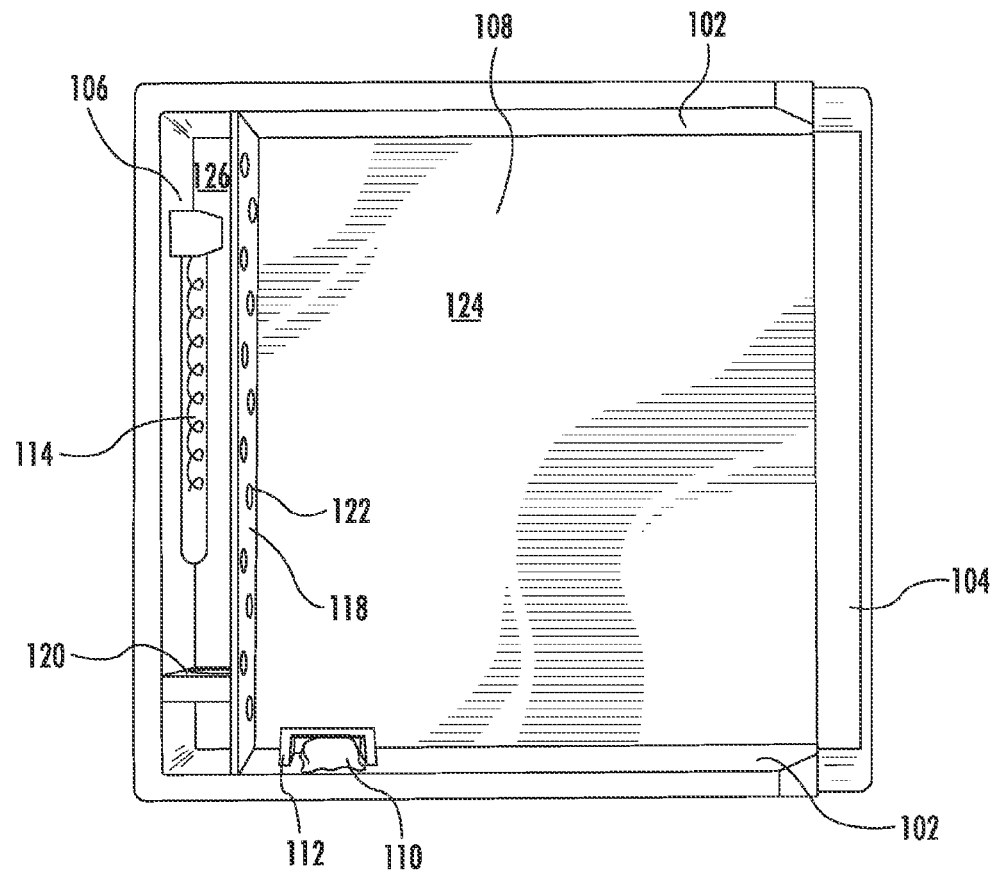
FIG. 2 illustrates a top view of one embodiment of the crisper.

As shown in FIG. 1, the crisper's 100 structure generally comprises housing sides 102, a housing front 104, a housing rear 106, and a floor 108 (shown in FIG. 2). Though the crisper 100 is illustrated having a substantially cuboid form, the crisper shape can be varied and manufactured to accordingly fit within the confines of various refrigerator shapes and internal refrigerator contours.

Figure 3:
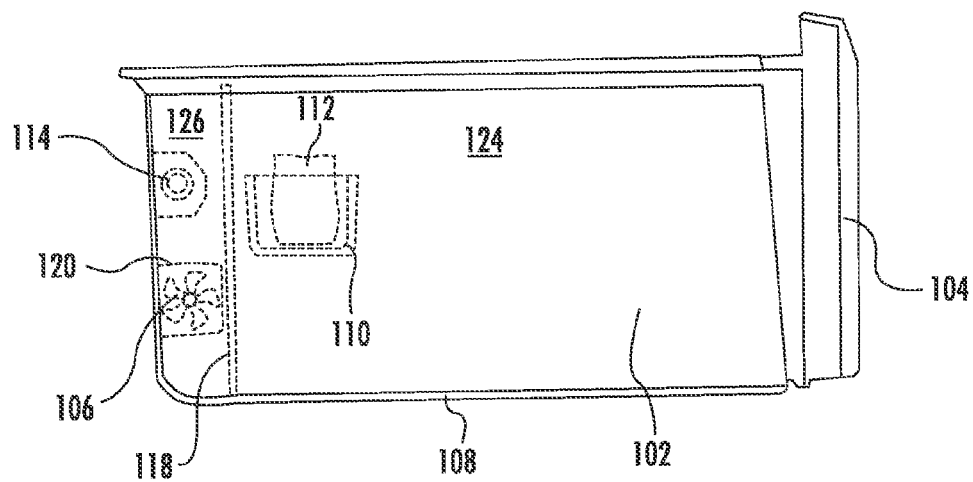
FIG. 3 illustrates a side cutaway view of the embodiment of the crisper shown in FIG. 2.

With reference to FIGS. 1-3, in a preferred embodiment, a holder 110 for an ethylene sachet 112 is installed on a surface 102, 104, 106, 108 of the crisper 100. To foster ethylene removal from proximate the produce in the crisper 100, media for the purpose of scrubbing ethylene from the air is present placed in the holder 110. The media is at least one of activated alumina, vermiculite, zeolite, and silica gel. The media is impregnated with potassium permanganate ($KMnO_4$). The mass of media utilized is tailored to the size of the crisper 100. Media pore size, pore volume, surface area, and bulk density are also tailored to the size of the crisper 100. Media with lower bulk density is desired over the same mass of media possessing a higher bulk density, due to the greater surface area of the lower bulk density media providing greater availability of $KMnO_4$ to ethylene gas. The mass, pore size, pore volume, surface area, and bulk density required for the crisper 100 will be readily apparent to those skilled in the art. The media performs two primary functions: 1) to provide an absorptive surface to trap ethylene gas molecules, and 2) to provide a substrate on which $KMnO_4$ is carried. $KMnO_4$ is an oxidizing agent that reacts with ethylene, oxidizing it to ethylene glycol which does not markedly affect produce ripening. The crisper 100, in a preferred embodiment, comprises at least one sachet 112 containing 5 mg $KMnO_4$ impregnated zeolite. Besides or in conjunction with sachets, KMnO$_4$ impregnated filters and pellets may be used in the crisper 100.

In another embodiment, ultraviolet light-mediated photocatalysis of titanium oxide reduces ethylene levels in the crisper 100 (the ultraviolet light source is optically sequestered from the produce). In one embodiment of the crisper 100, at least one dedicated pocket, bag, shelf, hook, or net provides a location for at least one sachet containing ethylene scrubbing media, all of which are referred to as holders 110.

Titanium dioxide is known to be a photocatalyst under ultraviolet (UV) light. When Titanium dioxide is spiked with nitrogen ions or doped with metal oxide like tungsten trioxide, it is also a photocatalyst under either visible or UV light. The titanium dioxide photocatalytic reaction breaks down ethylene gas into carbon dioxide and water vapor. Additionally, photocatalytic oxidation provides the added benefit of reducing bacteria, molds, and odors. In one embodiment of the invention, a titanium dioxide photocatalyst is in communication with the crisper 100 for the purpose of scrubbing ethylene gas and preventing the premature ripening and spoiling of the fruits and vegetables contained within the crisper 100.

In one embodiment of the invention, the crisper 100 comprises a means to generate gaseous ozone, as is illustrated in FIGS. 1-3, as is depicted by an ozone-generating electrode 114. Ozone cannot be stored and transported like most other industrial gases, so must therefore be locally produced. Ozone can be produced in a number of ways known in the art. The most common methods are by the use of ultraviolet light and corona discharge. The levels of ozone produced within the crisper 100 are between approximately 0.005 ppm and approximately 0.35 ppm ozone, and preferably approximately 0.05 ppm to approximately 0.15 ppm.

The corona discharge method of ozone is employed for many industrial and personal uses. While multiple variations of the "hot spark" corona discharge method of ozone production exist, these units usually work by means of a corona discharge tube (one embodiment of the electrode 114). Corona discharge tubes are typically cost-effective and do not require an oxygen source other than the ambient air to produce ozone. In one embodiment of the invention, ozone is generated with a corona discharge device. In such a device, air passes through an electrical field wherein ozone is generated. The preferred embodiment of an ozone generator is a variation of the corona discharge method.

Figure 4:
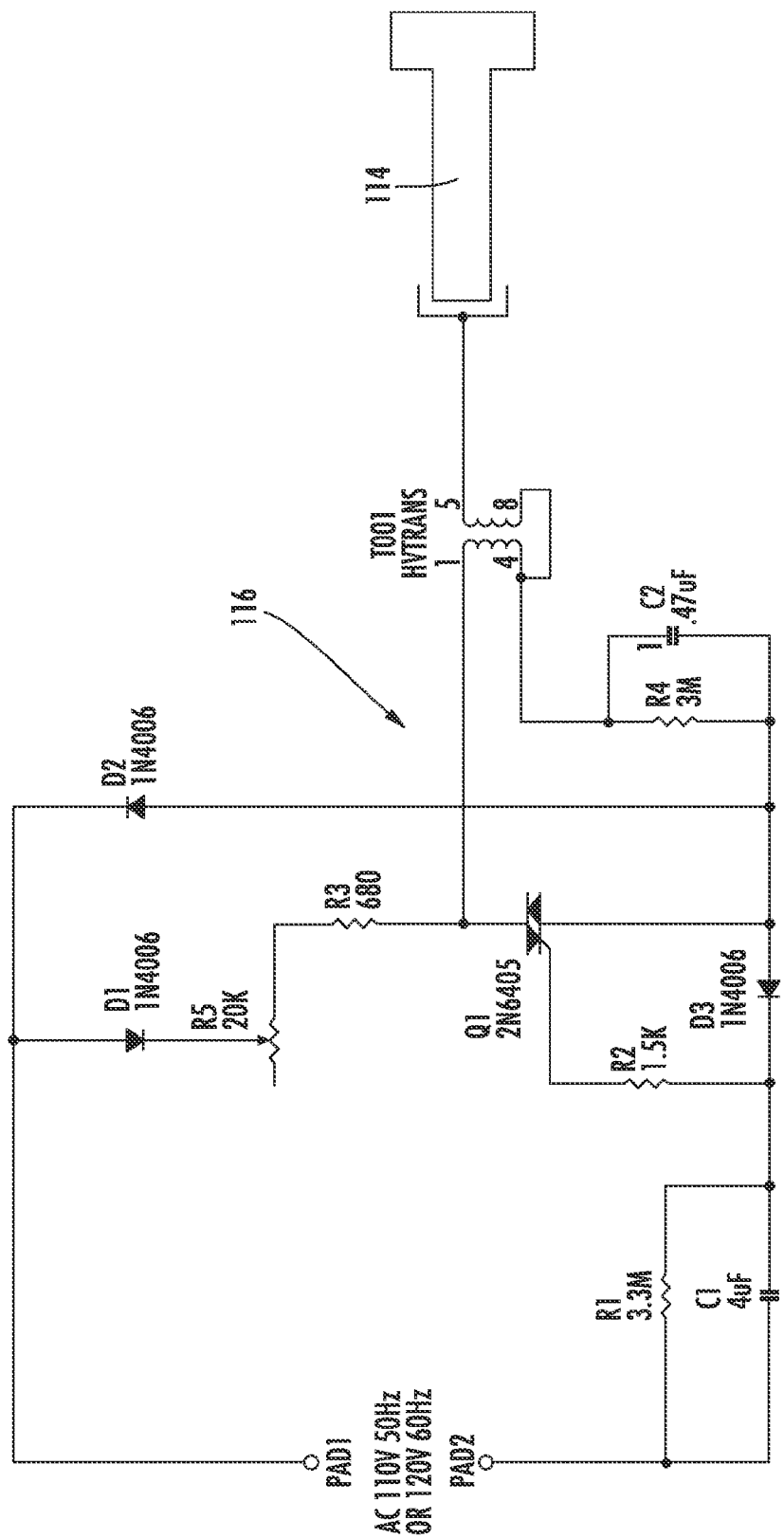
FIG. 4 illustrates an example of an ozone generation circuit.

FIG. 4 illustrates an example of an illustrative embodiment of a circuit 116 used to drive the generation of ozone via corona discharge. This circuit 116 comprises a silicon controlled rectifier Q1, which is a positive-negative-positive-negative (PNPN) four-layer semiconductor device that normally acts as an open circuit, but switches rapidly to a conducting state when an appropriate gate signal is applied to the gate terminal. In this application, it operates as a full wave rectified high voltage on-off generator to drive the primary winding of step up transformer T001. As the forward voltage across the anode and cathode is adjusted by the potentiometer R5, the amount of current into the transformer and the rate of oscillation is controlled.

A suppression ("snubber") circuit comprising a resister R4 and capacitor C2 protect the silicon controlled rectifier Q1 from overvoltage damage. Gate turn-on current is supplied by resister R2. Diodes D2 and D3 complete the full wave circuit. Capacitor C1 provides alternating current isolation as well as adequate current to drive the circuit 116.

An electrode 114 in communication with the circuit 116 is ultimately responsible for the production of ozone. As the primary winding of the transformer T001 is excited, the secondary winding of the transformer T001 drives a high voltage potential into a coiled metal element inside the electrode 114 that exceeds the dielectric breakdown of dry air, which in turn excites electrons to produce a positive corona that is initiated by an exogenous ionization event in a region of high potential gradient. The electrons resulting from the ionization are attracted toward the coiled electrode, and the positive ions repelled from it. By undergoing inelastic collisions closer and closer to the curved electrode, additional molecules are ionized in an electron cascade. The electron collisions excite the positive ions so that photons of short wavelength light are emitted. It is this that gives a blue-purple corona discharge its characteristic glow. These photons play an important part in producing the new seed electrons which are required to sustain the corona and for ozone to be continuously produced. The levels of ozone produced by this circuit and electrode combination, when installed in the crisper are between approximately 0.005 ppm and approximately 0.35 ppm ozone, and preferable at approximately 0.05 ppm to approximately 0.15 ppm ozone. Because of the high reactivity of ozone, materials employed in electrode construction include stainless steel (quality 316L), titanium, aluminum (as long as no moisture is present), glass, polytetrafluoroethylene, or polyvinylidene fluoride. Silicone rubbers may also be employed since ozone concentrations in the present invention are relatively low.

In one embodiment of the invention ozone is generated with an ultraviolet (UV) lamp. A UV lamp emitting light at approximately 185 nm in the presences of air (which is approximately 21% oxygen) will cause some diatomic oxygen (O$_2$) molecules to split, resulting in single oxygen atoms (O$^-$) that bind to other diatomic oxygen molecules to form ozone (O$_3$). UV mediated ozone generation is advantageous in the current invention, for it is not susceptible to nitric oxide formation, as are some corona discharge-based devices operating in a humid environment.

Referring again to FIGS. 2 and 3, in one embodiment the crisper 100 comprises a divider 118. The divider comprises air passageways 122, such as, without limitation, slots, holes, grates, or perforations. The divider 118 serves a number of purposes: First, the divider protects the electrode 114 from accidental breakage; Second, in the case of a UV source, the divider 118 protects a user's eyes from potentially harmful UV radiation; and Third, the divider 118 houses a fan 120.

The fan 120 promotes circulation of ozone gas, air, and circulation of ethylene gas proximate the ethylene sachet 112. The air passageways 122 allow gas circulation between the produce compartment 124, produce within the produce compartment 124, and the rear compartment 126, these compartments 124, 126 being defined by the placement of the divider 118. The fan 120 also promotes a more even temperature within the crisper 100.

Figure 5:
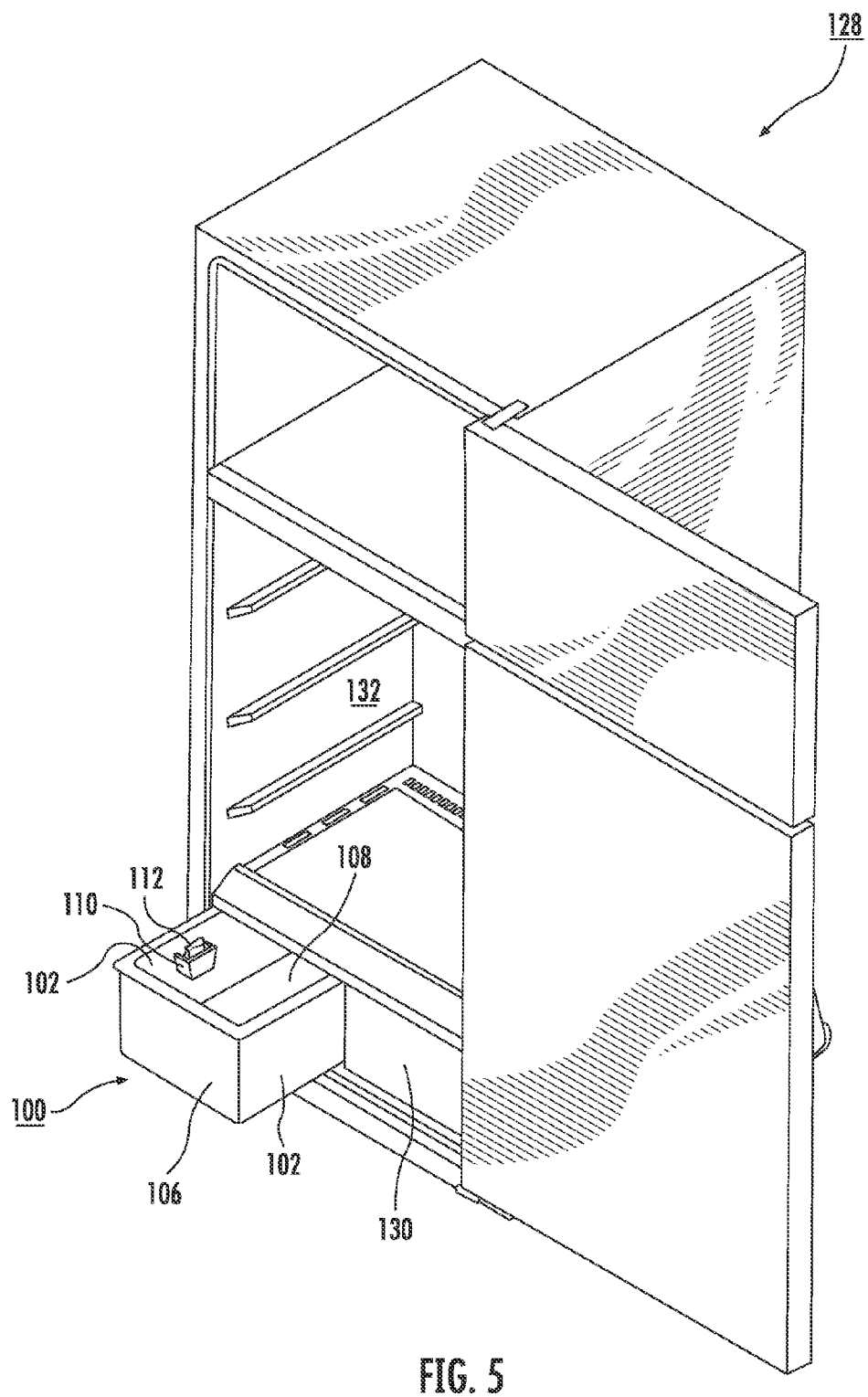
FIG. 5 illustrates a front perspective view of one embodiment of the crisper installed in a refrigerator.

FIG. 5 illustrates one embodiment of the crisper 100 installed in a refrigerator 128. In this example, the crisper 100 is situated "side-by-side" another drawer 130. In one embodiment the drawer 130 is an additional crisper 100. In another embodiment, the crisper 100 is the only drawer in a refrigerator. In another embodiment, the crisper 100 is situated above or below another drawer 130 or an additional crisper 100.

Figure 6:
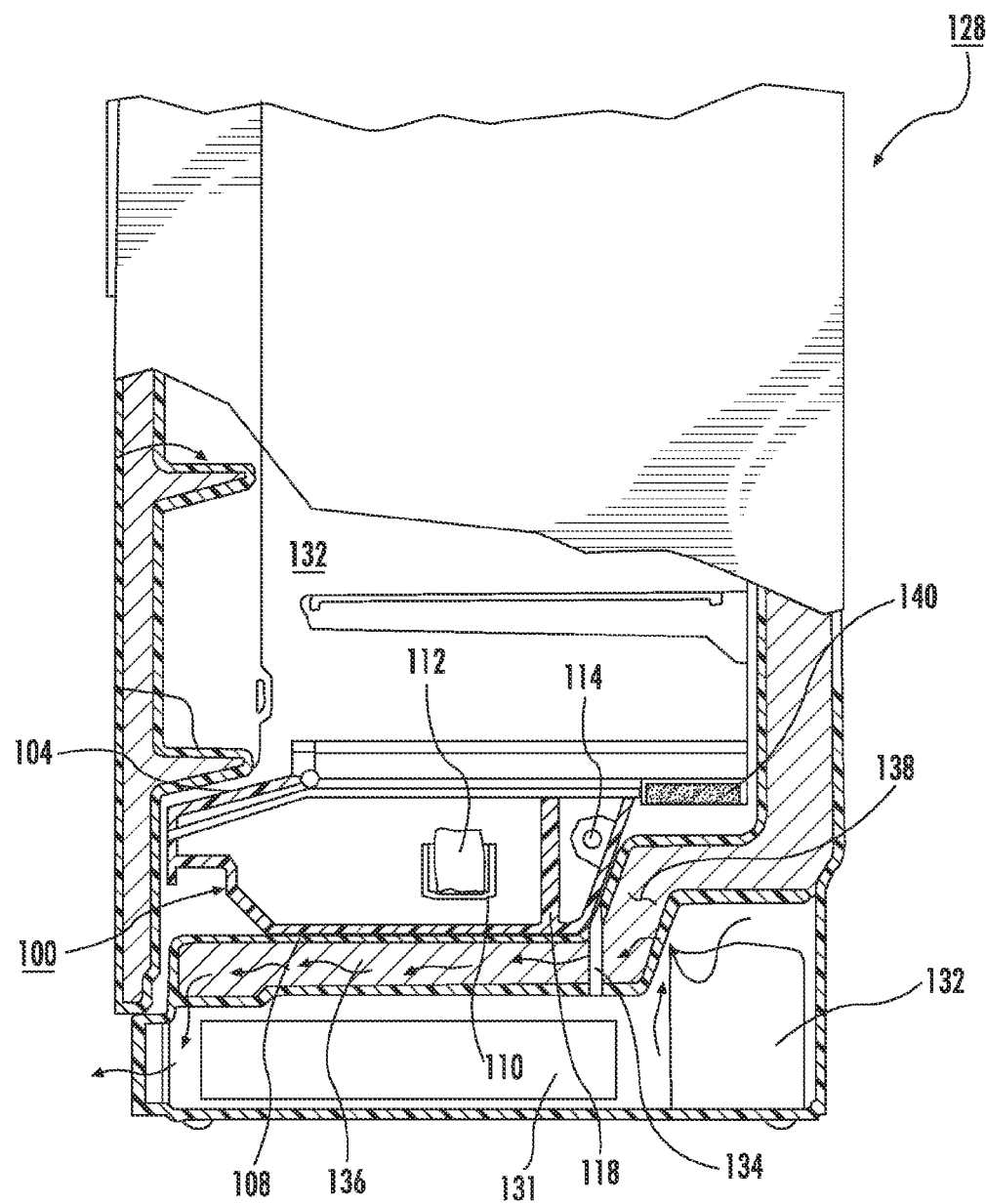
FIG. 6 illustrates a side cutaway view of one embodiment of the crisper installed in a refrigerator.

FIG. 6 illustrates an embodiment of the crisper 100, wherein the shape of the crisper 100 is contoured to maximize the available space within the refrigerator 128.

With continuing reference to FIG. 6, an embodiment of the invention comprises a heater 131 to maintain the crisper 100 at a temperature higher than that in the main compartment 132 of the refrigerator 128. The crisper 100 is maintained at a temperature ranging from 8° C. to 17° C., with the preferred temperature being 13° C. The heater 131 is at least one of an electric heating element, thermoelectric heating device, gas heating element, or a means to scavenge heat generated by the refrigerator's 128 compressor 132.

In one embodiment, scavenging heat is accomplished by turning on a heating fan 134 that blows heated air generated by the compressor 132 through a conduit 136 proximate the crisper 100. A flap 138 blocks the conduit 136 from being heated by hot air currents, but opens by the vacuum created by the operating heating fan 134. Hot air is exhausted from the conduit 136.

A controller 140 houses the electronics necessary for the crisper 100 to function. In particular, the controller 140 constantly monitors the temperature within the crisper 100. Preferably, the crisper maintains produce at temperatures recommended by the United States Department of Agriculture Guidelines and guidelines proffered by the Produce Marketing Association. A thermostat input dictates when heater 131 must regulate the crisper's 100 temperature. Such information may be displayed by a digital readout. Additionally, an embodiment of the controller 140 houses the circuit 116 to drive the ozone generator. Other embodiments contemplated by the invention include means to measure, control, or display the humidity of the crisper 100. Other embodiments contemplated by the invention include means to measure, control, or display the ethylene concentrations of the crisper 100.

Method of Reducing Postharvest Produce Deterioration

The present invention contemplates a method of reducing the severity of postharvest produce deterioration. The method preferably utilizes the crisper 100 described herein. The method includes the step of placing produce in the crisper 100 of a suitable size and dimension to encase the produce. The crisper 100 is capable of being substantially sealed. The crisper 100 is maintained at a temperature ranging from 8° C. to 17° C., with the preferred temperature being about 13° C. Additionally, ozone is introduced into the chamber so that a chamber ozone concentration is maintained from approximately 0.005 ppm to approximately 0.35 ppm, with a preferred concentration range between approximately 0.05 ppm to approximately 0.15 ppm. A high cutoff point of approximately 0.3 ppm ozone may be maintained to ensure that ozone levels remain below permissible levels as established by Occupational Health and Safety Administration (OSHA) regulations. In a preferred embodiment, the ozone is introduced into the crisper 100 by an ozone generator that is installed within the crisper. In one embodiment, ethylene is scrubbed from the chamber environment. In a preferred embodiment, ethylene concentrations within the chamber remain below 0.015 ppm. Preferably, 5-gram sachets of potassium permanganate are placed within the crisper 100 for the purpose of ethylene scrubbing, though other methods of ethylene scrubbing will be clear to those skilled in the art. The step of maintaining a relative humidity from 70% to 100% within the chamber is also contemplated with a preferred relative humidity level being about 95%. The crisper 100 is housed within a refrigeration unit, such that as found in a residential or commercial kitchen environment.

Examples and Experimental Data

The following experimental data compared the postharvest degradation of bananas and tomatoes in various conditions. The control ("room condition") temperatures ranged from approximately 22° C. to 25° C., while experimental refrigerated temperatures ranged from approximately 12° C. to 15° C. Relative humidity for control groups was maintained at approximately 25% RH to 50% RH, while experimental groups were maintained between approximately 85% RH to 100% RH. Ethylene gas concentrations were maintained in control groups between approximately 0.02 ppm and 0.035 ppm, while some experimental groups were maintained between approximately 0.0 ppm and 0.01 ppm. Ozone was not introduced in control groups, while some experimental groups were maintained between approximately 0.08 ppm and 0.095 ppm ozone, which is within the acceptable level range allowed by the Occupational Safety and Health Administration (OSHA) regulations for such an application.

TABLE 1

Moisture Loss per Banana/Tomato (after 21 Days)

| | BANANA | | TOMATO | |
| --- | --- | --- | --- | --- |
| STORAGE CONDITION | Mass | % Moisture Loss | Mass | % Moisture Loss |
| OZONE TREATED (13° C.) | 18.1 g | 10.5% | 3.4 g | 2.6% |
| OZONE + ETHYLENE SCRUBBING (13° C.) | 12.1 g | 5.3% | 2.1 g | 1.6% |
| AMBIENT/ROOM TEMPERATURE | 86.2 g | 38.4% | 7.2 g | 5.5% |

*Note:
The standard error of the mean between treatments for bananas is 27.8 g and for tomatoes is 1.5 g Bananas and tomatoes were generally weighed every 2 days to track moisture loss. Table 1 summarizes the amount of moisture lost per individual banana or tomato for each storage condition. There was only a minimal discrepancy between the amount of moisture lost in the two 13° C. storage treatments. Moisture loss was lower in the treatment with additional ethylene scrubbing for both bananas and tomatoes, but the difference was within the standard error and thus was not statistically significant. However, fruit left exposed to the ambient/room temperature conditions were found to lose much more moisture. From these results, it can be concluded that lower temperatures with higher RH result in improved water retention in these fruit. Furthermore, it is possible that the removal of additional ethylene using ethylene scrubbing sachets may improve the water retention.

TABLE 2

Banana Firmness Evaluated at 6 mm Deformation (Force in kg)

| | OZONE (13° C.) | OZONE & ETHYLNE SCRUBBING (13° C.) | CONT (ROOM TEMPERATURE) |
| --- | --- | --- | --- |
| DAY 0 | 4.226 | 4.159 | 4.191 |
| DAY 6 | 3.522 | 3.772 | 1.973 |
| DAY 12 | 3.031 | 3.438 | 1.052 |
| DAY 14 | 2.869 | 3.381 | 0.601 |
| DAY 16 | 2.972 | 3.656 | 0.391 |
| DAY 19 | 2.557 | 3.013 | 0.356 |
| DAY 21 | 2.534 | 3.128 | 0.402 |

Table 2 shows that bananas in both of the 13° C. storage treatments exhibited improved preservation of firmness over bananas in ambient/room conditions. This is indicated by higher force values for the bananas stored at 13° C., particularly with the bananas in the ozone with ethylene scrubbing treatment. Thus, the treatment with ozone and ethylene scrubbing provided better preservation of firmness over the treatment with ozone only.

TABLE 3

Tomato Firmness Evaluated at 3 mm Deformation (Force in kg)

|  | OZONE (13° C.) | OZONE & ETHYLNE SCRUBBING (13° C.) | CONT (ROOM TEMPERATURE) |
|---|---|---|---|
| DAY 0 | 3.004 | 2.988 | 2.959 |
| DAY 06 | 2.354 | 2.418 | 1.533 |
| DAY 12 | 2.168 | 2.291 | 1.192 |
| DAY 14 | 2.187 | 2.197 | 1.207 |
| DAY 16 | 2.142 | 1.967 | 1.367 |
| DAY 19 | 1.825 | 1.541 | 1.197 |
| DAY 21 | 1.619 | 1.468 | 1.082 |

Table 3 shows that tomatoes in the 13° C. storage treatments generally exhibited improved preservation of firmness compared with tomatoes in the ambient/room temperature treatment. This is indicated by elevated force values for the tomatoes stored in 13° C. storage conditions compared with the lower force values observed with tomatoes stored in the ambient/room conditions. Minimal distinction can be seen between the firmness in tomatoes stored in the ozone treatment and the treatment with ozone and ethylene scrubbing.

Ozone concentration in the 13° C. storage treatments were effectively regulated and maintained within permissible levels as established by OSHA regulations. The presence of ozone in the 13° C. treatments effectively reduced the ethylene concentration by about ⅔, while the treatment with additional ethylene scrubbing further reduced the ethylene concentration to essentially negligible levels.

The tomatoes and bananas that were held in the ambient/room temperature conditions on the countertop were observed to be exceptionally shriveled and soft after only 6 and 12 days, respectively. Tomatoes in this storage condition were also found to have mold growth after 14 days particularly near the stem end. It was also determined that produce exposed to the ambient/room temperature conditions lost a significant amount of moisture over the 21 day trial. Furthermore, firmness measurements using a Texture Analyzer Plus (Stable Micro Systems) found that both the bananas and tomatoes had severely softened in the room temperature storage condition. Thus, storage in the ambient/room temperature treatment resulted in considerably diminished produce quality.

Bananas and tomatoes held at 13° C. exhibited significantly better maintenance of quality compared with produce stored in the ambient/room temperature conditions. Water retention was further improved in the treatment using ozone with additional ethylene scrubbing. Better color retention was also observed for both the bananas and tomatoes that received ozone with ethylene scrubbing. Greater levels of brown-spotting were observed in the bananas treated with only ozone than those treated with ozone and ethylene scrubbing. Additionally, more extensive shriveling and tearing of tomato flesh was observed with only ozone than with ozone plus ethylene scrubbing. Banana firmness was also best preserved in the fruit stored in the ozone with ethylene scrubbing treatment. Thus, storage at 13° C. using ozone with additional ethylene scrubbing resulted in the highest quality produce.

What is claimed is:

1. A crisper drawer for postponing postharvest deterioration comprising:
    a. a drawer housing having a substantially sealable interior chamber for storage of produce;
    b. an ethylene scrubber;
    c. a coronal discharge circuit, the coronal discharge circuit affixed to the interior chamber; and
    d. an ozone level controller in communication with the coronal discharge circuit;
    e. whereby the ozone level controller turns off the coronal discharge circuit in response to ozone levels above 0.15 ppm, and turns on the coronal discharge circuit in response to ozone levels below 0.05 ppm.

2. A crisper drawer according to claim 1, further comprising:
    a. a heating element;
    b. whereby the heating element activates to increase a temperature within the crisper drawer when the temperature within the crisper drawer falls below the temperature outside the crisper drawer.

3. A crisper drawer according to claim 1 wherein the ethylene scrubber comprises a media impregnated with potassium permanganate.

4. A crisper drawer according to claim 3 wherein the media impregnated with potassium permanganate is selected from the group consisting of alumina, silica gel, vermiculite, and zeolite.

5. A crisper drawer according to claim 1, further comprising:
    a. a humidity controller:
    b. whereby the humidity controller maintains humidity in the chamber between 80 percent and 100 percent.

* * * * *